(12) United States Patent
Hu et al.

(10) Patent No.: US 11,275,192 B2
(45) Date of Patent: Mar. 15, 2022

(54) PILE INTEGRITY DETECTION SYSTEM BASED ON CROSS-HOLE SONIC LOGGING METHOD

(71) Applicants: Guangzhou Testing Centre of Construction Quality and Safety Co., Ltd., Guangzhou (CN); Guangzhou Institute of Building Science Co., Ltd., Guangzhou (CN)

(72) Inventors: Hesong Hu, Guangzhou (CN); Chunlin Liu, Guangzhou (CN); Shuo Zhang, Guangzhou (CN); Xueshun Yang, Guangzhou (CN)

(73) Assignees: GUANGZHOU TESTING CENTRE OF CONSTRUCTION QUALITY AND SAFETY CO., LTD., Guangzhou (CN); GUANGZHOU INSTITUTE OF BUILDING SCIENCE CO., LTD., Guangzhou (CN)

( * ) Notice: Subject to any disclaimer, the term of this patent is extended or adjusted under 35 U.S.C. 154(b) by 376 days.

(21) Appl. No.: 16/503,930

(22) Filed: Jul. 5, 2019

(65) Prior Publication Data
US 2020/0103545 A1 Apr. 2, 2020

(30) Foreign Application Priority Data
Sep. 27, 2018 (CN) .......................... 201811133464.4

(51) Int. Cl.
*G01V 1/42* (2006.01)
(52) U.S. Cl.
CPC ........ *G01V 1/42* (2013.01); *G01V 2210/6222* (2013.01)

(58) Field of Classification Search
CPC .......................... G01V 1/42; G01V 2210/6222
See application file for complete search history.

(56) References Cited

U.S. PATENT DOCUMENTS
6,295,907 B1   10/2001  Schafer et al.

FOREIGN PATENT DOCUMENTS
| CN | 1077287 A | | 10/1993 | |
|---|---|---|---|---|
| CN | 107067947 A | * | 8/2017 | ............. G09B 25/06 |
| CN | 108318584 A | * | 7/2018 | ......... G01N 29/0672 |

OTHER PUBLICATIONS

ASTM Standard D6760-08, "Standard Test Method for Integrity Testing of Concrete Deep Foundations by Ultrasonic Crosshole Testing", ASTM 2008 (Year: 2008).*

(Continued)

*Primary Examiner* — Regis J Betsch
(74) *Attorney, Agent, or Firm* — Muncy, Geissler, Olds & Lowe, P.C.

(57) ABSTRACT

Provided is a pile integrity detection system based on cross-hole sonic logging method. The operator sets the ultrasonic detector into the measuring tubes of the to-be-detected pile, subsequently inputs the project data and activate the ultrasonic detector, by an acoustic wave transmission among a transmitter and a receiver, a wave energy data of the to-be-detected pile can be obtained, and the wave energy data and a project data will be automatically transmitted to the cloud computing module, thereby the integrity level of the to-be-detected pile can be determined without any manual analysis to the wave energy data, preventing from any error or deflection due to manual operation, whereby it greatly improves the accuracy and efficiency of detection and reduces the error rate.

9 Claims, 3 Drawing Sheets (56) References Cited

OTHER PUBLICATIONS

Gemes et al., "Data Analytics as a Service: unleashing the power of Cloud", Atos 2013 (Year: 2013).*
City of St. Joseph, Missouri, "Construction Observation Manual", 2009 (Year: 2009).*
Maya Kaczorowski, "How Google protects your data intransit", 2017 (Year: 2017).*
Pile Dynamics, Inc., "New accessory for Cross Hole Sonic Logging makes testing more comfortable" 2014 (Year: 2014).*
Nakaniwa et al., "Pile Driving and Drilling Monitoring Survey Technology U sing a Total Station", (Year: 2018).*

* cited by examiner

PILE INTEGRITY DETECTION SYSTEM BASED ON CROSS-HOLE SONIC LOGGING METHOD

CROSS REFERENCE TO RELATED APPLICATION

This application claims priority of Application No. 201811133464.4 filed in China on Sep. 27, 2018, under U.S.C. § 119, the entire contents of which are hereby incorporated by reference.

FIELD OF TECHNOLOGY

The following relates to a field of pile detection, in particular to a pile integrity detection system based on cross-hole sonic logging method.

BACKGROUND

The bored cast-in-place pile is a concealed work, and the quality of poured pile shafts is critical to the stability and safety of supporting superstructures. Due to the effects of the hydro geological conditions in the construction site, the technical level of technicians and the construction process, the pouring pile shafts commonly have some flaws of intercalated soil, cavity, segregation and brokenness. Therefore, the pile foundation needs to carry out the integrity detection before use, which is of great significance to the reliable judgment of the bearing capacity of pile foundations. The current methods for evaluating pile integrity mainly include core drilling method, low strain integrity testing method, high strain dynamic testing method and cross-hole sonic logging method. Each method has its own technical characteristics and range of application. The cross-hole sonic logging method is widely used to perform the pile foundation integrity detection in the fields of construction projects, hydraulic projects, transportation projects, due to its relatively flexibility, convenience, reliability, reasonable cost and wide range of application.

The cross-hole sonic logging method to judge the integrity of the pile is based on the observation and analysis of the acoustic wave parameters such as the propagation velocity and amplitude of wave in different media. In the prior art, the detection process generally includes, the transmitter and the receiver are placed in the measuring tubes inside the pile foundation, then the acoustic wave data between the transmitter and the receiver is collected, recorded, and then stored using the acoustic wave measuring instrument. The integrity of pouring pile shafts will therefore be evaluated according to the wave signal data and the known discrimination method, subsequently a detection report can be made. However, the accuracy and efficiency of the current detection, to a certain extent, depend on the selection of the discrimination method and the influence of the construction environment. The inclination of the tubes during construction and the unevenness of the pouring concrete of piles at different heights will both cause the variation of the acoustic wave measurement data along the pile depth. The difference in the arrival time of the first wave for various measuring points on the same acoustic wave detecting section may result in the critical value and the abnormal point analyzed by the mathematical statistical method or the PSD method, which is different from the actual one. In order to avoid misjudgment, some acoustic wave signal data needs to be corrected manually, which consumes a lot of manpower and time and reduces the detection efficiency.

SUMMARY

An aspect relates to a pile integrity detection system based on cross-hole sonic logging method, which does not require the operator to perform any revision to the wave energy data, realizing automated pile integrity detection. It greatly improves the efficiency of detection and reduces the error rate.

The following provides the following technical solution.

A pile integrity detection system based on cross-hole sonic logging method, comprising a field detection module, a communication transmission module and a cloud computing module; the field detection module is connected to the cloud computing module via the communication transmission module;

The field detection module comprises an ultrasonic detector which is connected to the communication transmission module; the ultrasonic detector comprises a controller, a transmitter and a receiver, the transmitter and the receiver are respectively connected to the controller via cables;

The controller is configured to, when receiving a sending instruction from the user, send an acoustic wave transmitting instruction to the transmitter, receive wave energy data of the receiver, and receive project data inputted by the user;

The transmitter is disposed and can be moved up/down in a first measuring tube of a to-be-detected pile, and can emit acoustic waves to the receiver according to the acoustic wave transmitting instruction which indicates the frequency and time period of emitting the acoustic wave;

The receiver is disposed and can be moved up/down in a second measuring tube of the to-be-detected pile, receiving acoustic waves emitted by the transmitter, then converting the received acoustic waves into wave energy data and transmitting it to the controller; the receiver and the transmitter are always disposed at same height, moved up/down simultaneously; the project data includes a centre-to-centre distance between the first measuring tube and the second measuring tube, and a compression wave velocity of the pouring concrete of the to-be-detected pile; the wave energy data includes an acoustic energy and a travel time of the acoustic waves, and the travel time is a period the acoustic wave reached the receiver from the transmitter;

The communication transmission module is configured to, when receiving a transmission instruction from the user, transmit the project data and the wave energy data in the field detection module to the cloud computing module;

The cloud computing module is configured to perform data analysis on the project data and the wave energy data by using a preset wave energy analysis method to determine the integrity of the to-be-detected pile.

Further, the wave energy data includes a wave energy and a travel time of the acoustic wave which was emitted by the transmitter, and was received by the receiver at different heights of several detecting sections; the detecting section is composed of any two measuring tubes within the to-be-detected pile;

The cloud computing module is configured to perform the following steps to implement data analysis on the wave energy data and the project data, determine the integrity of the to-be-detected pile:

S1. Calculating the total wave energy $M_{ij}$ of the acoustic wave which was emitted by the transmitter, and was received by the receiver at height j of a detecting section i in a preset time period $[t_{ij}^k, t_{ij}^n]$; the calculation formula is as follows:

$$M_{ij} = \int_{t_{ij}^k}^{t_{ij}^n} |A_p(\zeta)| d\zeta$$

Wherein i, j, k, and n are positive integers;

$A_p(\zeta)$ is the wave energy which was received by the receiver at travel time $\zeta$;

$t_{ij}^k$ is the travel time of the acoustic wave which was received by the receiver at height j of a detecting section i at time k;

$t_{ij}^k = l_i/V_p$, where $l_i$ is the centre-to-centre distance between two measuring tubes in the detection section i, $V_p$ is the compression wave velocity of the pouring concrete of the to-be-detected pile;

$M_{ij}$ is the total wave energy at height j of the detecting section i in time period $[t_{ij}^k, t_{ij}^n]$, and $[t_{ij}^k, t_{ij}^n]$ is 4 to 6 times the time period of emitting the acoustic wave;

S2. Calculating the total wave energy $M_{ij}$ by using a trapezoidal integration method, like the following formula:

$$M_{ij} = \sum_{m=k}^{n} \left[\frac{1}{2}(|A_p(t_{ij}^m)| + |A_p(t_{ij}^{m+1})|)\Delta t\right]$$

Wherein: m is a positive integer; $\Delta t$ is the time subinterval of receiving the acoustic wave by the receiver;

S3. Performing dimensionless processing on the total wave energy $M_{ij}$ to obtain the dimensionless total wave energy $\overline{M}_{ij}$ which was received by the receiver at height j of the detecting section i in a preset time period $[t_{ij}^k, t_{ij}^n]$, by the following formula:

$$\overline{M}_{ij} = \sum_{m=k}^{n} \left[\frac{1}{2}(|A_p(t_{ij}^m)| + |A_p(t_{ij}^{m+1})|)\Delta t\right] / (t_{ij}^n - t_{ij}^k)$$

S4. Comparing the dimensionless total wave energy $\overline{M}_{ij}$ with a preset threshold; when the dimensionless total wave energy $\overline{M}_{ij}$ is less than the preset threshold, the cloud computing module determines that some flaws exist at the height j of the detecting section i in the to-be-detected pile; otherwise, the cloud computing module determines that the height j of the detecting section i in the to-be-detected pile is normal.

Further, the cloud computing module is further configured to perform the following steps to implement the setting of the preset threshold:

S5. Getting a plurality of dimensionless total wave energy $\overline{M}_{i1}, \overline{M}_{i2}, \ldots, \overline{M}_{ih}$ which were received by the receiver at height positions 1, 2, ..., h of the detecting section i by performing the above steps S1-S3;

S6. Sorting all the dimensionless total wave energies, and deleting h' minimum values and h' maximum values, and calculate an average relative total wave energy $\overset{\scriptscriptstyle 1}{M}_i$ which were received by the receiver in the detecting section i, by the following formula:

$$\overset{\scriptscriptstyle 1}{M}_i = \frac{1}{h - 2h'} \sum_{j=1}^{h-2h'} \overline{M}_{ij}$$

Wherein: h and h' are positive integers, and h'=2h/5;

S7. Setting the preset threshold to $0.5 \overset{\scriptscriptstyle 1}{M}_i$.

Further, the field detection module further comprises a photographing module which is connected to the communication transmission module, and is configured to record an audio and video data of the testing site when the operator detects the to-be-detected pile, and subsequently the audio and video data are transmitted to the cloud computing module via the communication transmission module.

Further, the communication transmission module further comprises an encryption module which is configured to encrypt a to-be-transmitted data before transmitting the data; the cloud computing module further comprises a decryption module which is configured to decrypt the data after receiving the encrypted data.

Further, the ultrasonic detector further comprises a transmission mechanism which is connected to a controller and a cable respectively, and the controller sends a traction command to the transmission mechanism when receiving a transmission instruction from the user; the transmission mechanism is configured to receive the traction command from the controller, and tow the cable controlling the simultaneous movement of the transmitter and the receiver according to the traction command; the traction command indicates a traction speed of the transmission mechanism.

Further, the transmission mechanism comprises a driving motor and a transmission wheel;

The transmission wheel is fixed to a driving shaft of the driving motor, and is connected to the cable; and The drive motor is connected to the controller, when the driving motor receives the traction command, and can drive the driving shaft to rotate subsequently drive the drive wheel to tow the cable, whereby the transmitter and the receiver can be moved up/down simultaneously.

Further, the cloud computing module further comprises a report generating module which can generate a detection report for a to-be-detected pile by filling the integrity information of the to-be-detected pile into a report template.

Further, the field detection module further comprises a storage which can store the wave energy data, the project data, a geographical location information, and the image data.

Further, the field detection module further comprises a GPS locator which is connected to the communication transmission module, and is configured to acquire a geographic location information of the to-be-detected pile, and the geographic location information is transmitted to the cloud computing module via the communication transmission module, then the cloud computing module compares the geographic location information with a preset geographic location information of the to-be-detected pile to verify the authenticity of the wave energy data.

Comparing to the prior art, the advantage of the present invention is as follows:

The present invention discloses a pile integrity detection system based on cross-hole sonic logging method. The operator sets the ultrasonic detector into the measuring tubes of the to-be-detected pile, subsequently inputs the project data and activates the ultrasonic detector, by an acoustic wave transmission among a transmitter and a receiver, a wave energy data of the to-be-detected pile can be obtained, and the wave energy data and the project data will be automatically transmitted to the cloud computing module. Thereby, the integrity of the to-be-detected pile can be reasonably determined without any manual analysis to the wave energy data, preventing from any error or deflection due to manual operation, whereby it greatly improves the accuracy and efficiency of detection and reduces the error rate.

BRIEF DESCRIPTION OF DRAWINGS

The embodiments of the present disclosure will be described hereinafter with reference to the following figures, wherein.

DETAILED DESCRIPTION

The detailed description to the concept, the specific steps and the effect of the invention will be presented hereinafter with reference to the figures and the embodiment, for understanding the invention easily.

Figure 1:
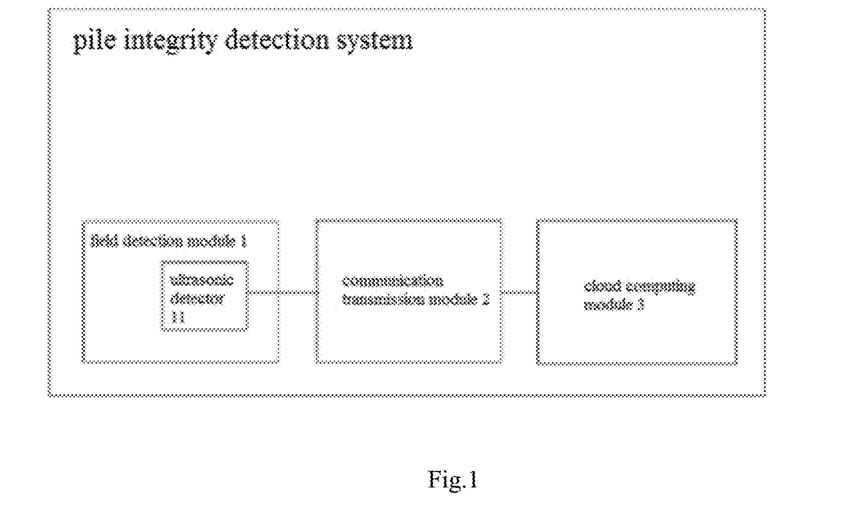
FIG. 1 depicts a structural schematic diagram of a pile integrity detection system based on the cross-hole sonic logging method in accordance with one embodiment of the invention.
Figure 2:
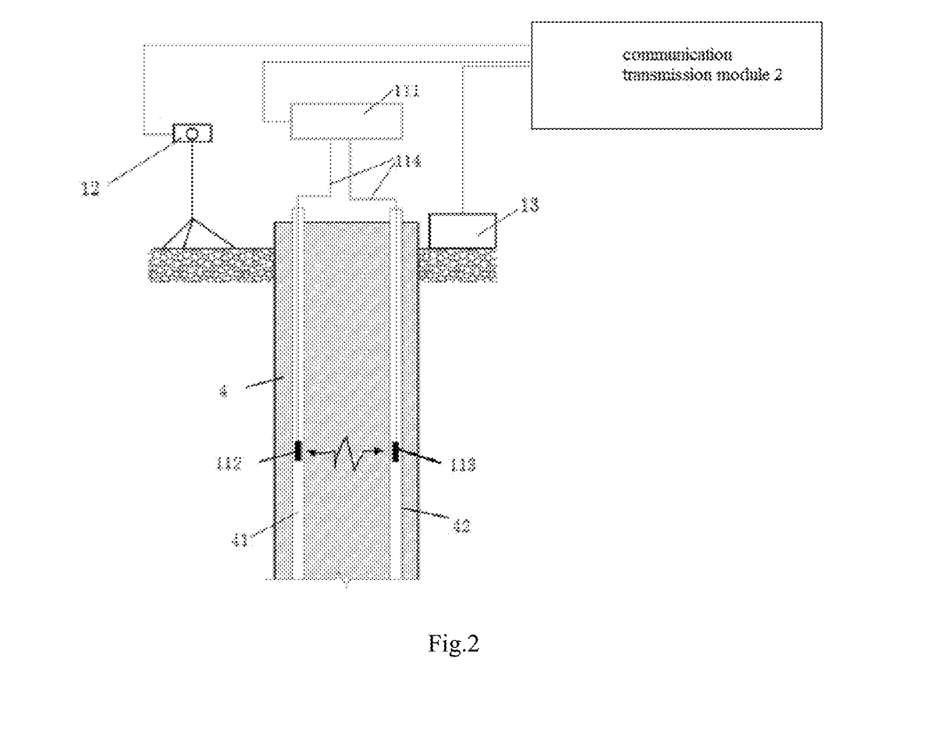
FIG. 2 depicts a structural schematic diagram of the ultrasonic detector 11 in accordance with one embodiment of the invention.

As shown in FIG. 1, the invention discloses a pile integrity detection system based on cross-hole sonic logging method, comprising a field detection module 1, a communication transmission module 2, and a cloud computing module 3; the field detection module 1 is connected to the cloud computing module 3 via the communication transmission module 2;

The field detection module 1 comprises an ultrasonic detector 11 which is connected to the communication transmission module 2;

Specifically, as shown in FIG. 2, the ultrasonic detector 11 comprises a controller 111, a transmitter 112 and a receiver 113; the transmitter 112 and the receiver 113 are respectively connected to the controller 111 via cables 114;

The controller 111 is configured to, when receiving a sending instruction from the user, send an acoustic wave transmitting instruction to the transmitter 112, receive wave energy data from the receiver 113, and receive project data inputted by the user;

The transmitter 112 is disposed and can be moved up/down in a first measuring tube 41 of a to-be-detected pile 4, and can emit acoustic waves to the receiver 113 according to the acoustic wave transmitting instruction which indicates the frequency and time period of emitting the acoustic wave;

The receiver 113 is disposed and can be moved up/down in a second measuring tube 42 of the to-be-detected pile 4, receiving acoustic waves emitted by the transmitter 112, then converting the received acoustic waves into wave energy data and transmitting it to the controller 111; the receiver 113 and the transmitter 112 are always disposed at same height, moved up/down simultaneously. The project data includes a centre-to-centre distance between the first measuring tube 41 and the second measuring tube 42, and a compression wave velocity of the pouring concrete of the to-be-detected pile 4. The wave energy data includes an acoustic energy and a travel time of the acoustic waves, and the travel time is a period the acoustic wave reached the receiver 113 from the transmitter 112;

The communication transmission module 2 is configured to, when receiving a transmission instruction from the user, transmit the project data and the wave energy data in the field detection module 1 to the cloud computing module 3;

The cloud computing module 3 is configured to perform data analysis on the project data and the wave energy data by using a preset wave energy analysis method to determine the integrity of the to-be-detected pile 4.

By the above configuration, the operator can dispose the ultrasonic detector inside the measuring tubes of the to-be-detected pile, then inputs the project data and activates the ultrasonic detector, such that the acoustic wave can be transmitted from the transmitter to the receiver, and the wave energy data of the to-be-detected pile can be obtained, meanwhile the wave energy data and the project data will be automatically transmitted to the cloud computing module. Thereby the integrity of the to-be-detected pile can be reasonably determined automatically without the operator conducting any analysis to the wave energy data, preventing from any error or deflection due to manual operation, whereby it greatly improves the accuracy and efficiency of detection, and reduces the error rate.

Specifically, as shown in FIG. 2, the field detection module 1 further comprises a photographing module 12 which is connected to the communication transmission module 2 and is configured to record an audio and video data of the testing site when the operator detects the to-be-detected pile, and subsequently the audio and video data are transmitted to the cloud computing module 3 via the communication transmission module 2.

Specifically, as shown in FIG. 2, the field detection module 1 further comprises a GPS locator 13 which is connected to the communication transmission module 2 and is configured to acquire a geographic location information of the to-be-detected pile 4, and the geographic location information is transmitted to the cloud computing module 3 via the communication transmission module 2, then the cloud computing module 3 compares the geographic location information with the preset geographic location information of the to-be-detected pile 4 to verify the authenticity of the wave energy data.

In the actual engineering detection, after the data is collected by the transmitter and the receiver, the data is generally temporarily stored in the acoustic wave detector, then sent to the laboratory by the operator, for data interpretation and pile foundation integrity discrimination. In this process, data such as the original site information of the pile detection point and the acoustic wave detection data are possibly arbitrarily falsified, thus affecting the authenticity and credibility of the data. If an engineering accident occurs in the later stage, it is difficult to be verified and blamed.

Therefore, the photographing modulecan record the detection process, and the GPS locator can record the geographical position of the pile, then such recorded information can be transmitted to the cloud computing module, such that the geographic position can be verified to ensure the authenticity of the wave energy data of the pile. Meanwhile, when there is a problem in the verification, the recorded video for the detection process can be reviewed to find the origin of the problem, or the detection process can be supervised and verified, thereby reducing the risk of data being falsified, and also finding operational problems in the detection process so as to greatly improving the security of the system.

Figure 3:
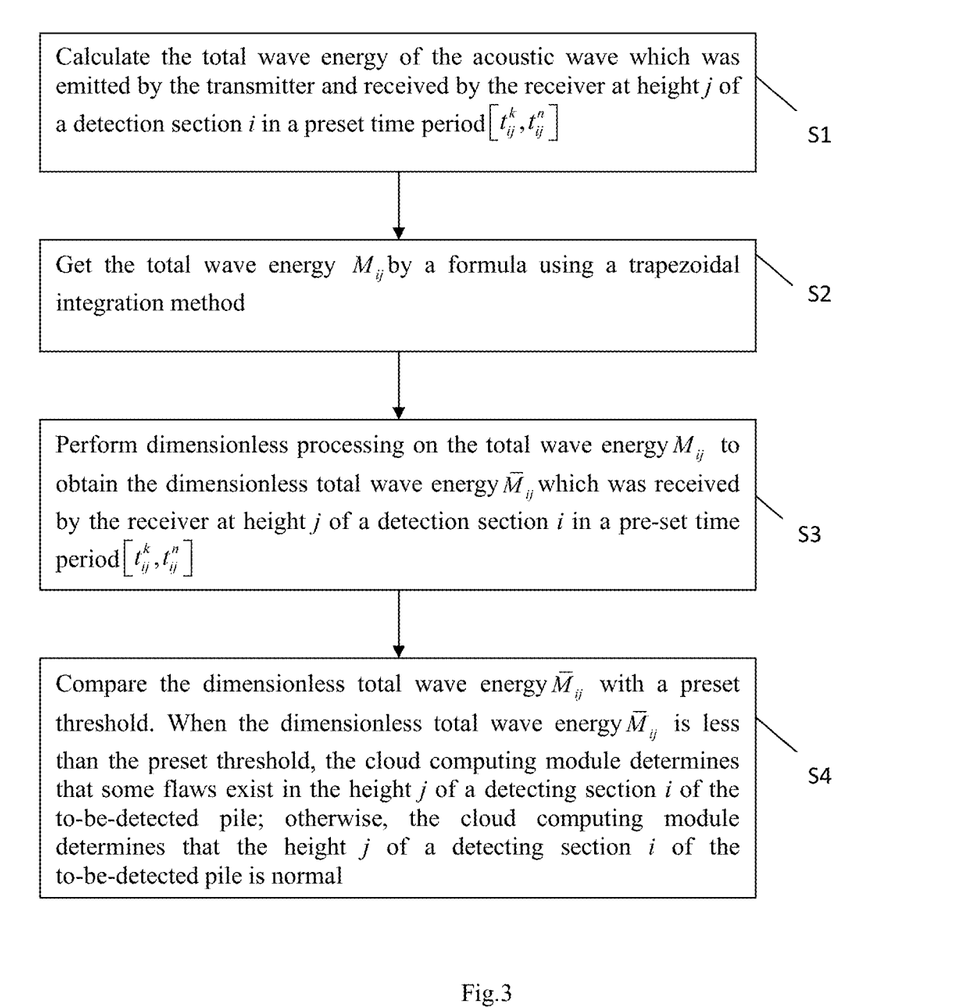
FIG. 3 depicts a schematic diagram of steps of a wave energy analysis method preset in the cloud computing module in accordance with one embodiment of the invention.

Specifically, the wave energy data includes the wave energy and the acoustic time of the acoustic wave which was emitted by the transmitter, and was received by the receiver at different heights of several detecting sections; the detecting section is composed of any two measuring tubes within the to-be-detected pile. As shown in FIG. 3, the cloud computing module is configured to perform the following steps to implement data analysis on the wave energy data and the project data, determining the integrity level of the to-be-detected pile:

S1. Calculating the total wave energy $M_{ij}$ of the acoustic wave which was emitted by the transmitter, and was received by the receiver at height j of a detecting section i in a preset time period $[t_{ij}^k, t_{ij}^n]$. The calculation formula is as follows:

$$M_{ij} = \int_{t_{ij}^k}^{t_{ij}^n} |A_p(\zeta)| d\zeta$$

Wherein i, j, k, and n are positive integers;

$A_p(\zeta)$ is the wave energy which was received by the receiver at travel time $\zeta$;

$t_{ij}^k$ is the travel time of the acoustic wave which was received by the receiver at height j of a detecting section i at time k;

$t_{ij}^k = l_i/V_p$, where $l_i$ is the centre-to-centre distance between two measuring tubes in the detection section i, $V_p$ is the compression wave velocity of the pouring concrete of the to-be-detected pile;

$M_{ij}$ is the total wave energy at height j of the detecting section i in a time period $[t_{ij}^k, t_{ij}^n]$, and $[t_{ij}^k, t_{ij}^n]$ is 4 to 6 times the time period of emitting the acoustic wave;

S2. Calculating the total wave energy $M_{ij}$ by using a trapezoidal integration method, like the following formula:

$$M_{ij} = \sum_{m=k}^{n} \left[ \frac{1}{2} (|A_p(t_{ij}^m)| + |A_p(t_{ij}^{m+1})|) \Delta t \right]$$

Wherein m is a positive integer;

$\Delta t$ is the time subinterval of receiving the acoustic wave by the receiver;

S3. Performing dimensionless processing on the total wave energy $M_{ij}$ to obtain the dimensionless total wave energy $\overline{M}_{ij}$ which was received by the receiver at height j of the detecting section i in a preset time period $[t_{ij}^k, t_{ij}^n]$, by the following formula, $$\overline{M}_{ij} = \sum_{m=k}^{n} \left[ \frac{1}{2} (|A_p(t_{ij}^m)| + |A_p(t_{ij}^{m+1})|) \Delta t \right] / (t_{ij}^n - t_{ij}^k)$$

S4. Comparing the dimensionless total wave energy $\overline{M}_{ij}$ with a preset threshold. When the dimensionless total wave energy $\overline{M}_{ij}$ is less than the preset threshold, the cloud computing module determines that some flaws exist at the height j of the detecting section i in the to-be-detected pile; otherwise, the cloud computing module determines that the height j of the detecting section i in the to-be-detected pile is normal.

By performing the above steps, S1 to S4, the cloud computing module uses the mathematical statistical method to calculate the total wave energy of multiple acoustic waves which was received by the receiver at the same height position, and then performs dimensionless processing on the total wave energy to eliminate the difference of the wave energy, caused by the different emission simple harmonic frequencies of the transmitter. Therefore, the total wave energy of different simple harmonic vibrations in a specified time period can be compared in the index and be classified according to the singular points. Eventually the dimensionless total wave energy is compared with the preset threshold so as to obtain the integrity information of the to-be-tested pile at this height position. Compared with the conventional acoustic wave detection technology, the cloud computing module according to the invention can obtain the integrity information of the pile based on the analysis of a large amount of acoustic wave data, without any manual analysis on each acoustic wave data, saving manpower and material resources while ensuring the accuracy of the conclusion.

Figure 4:
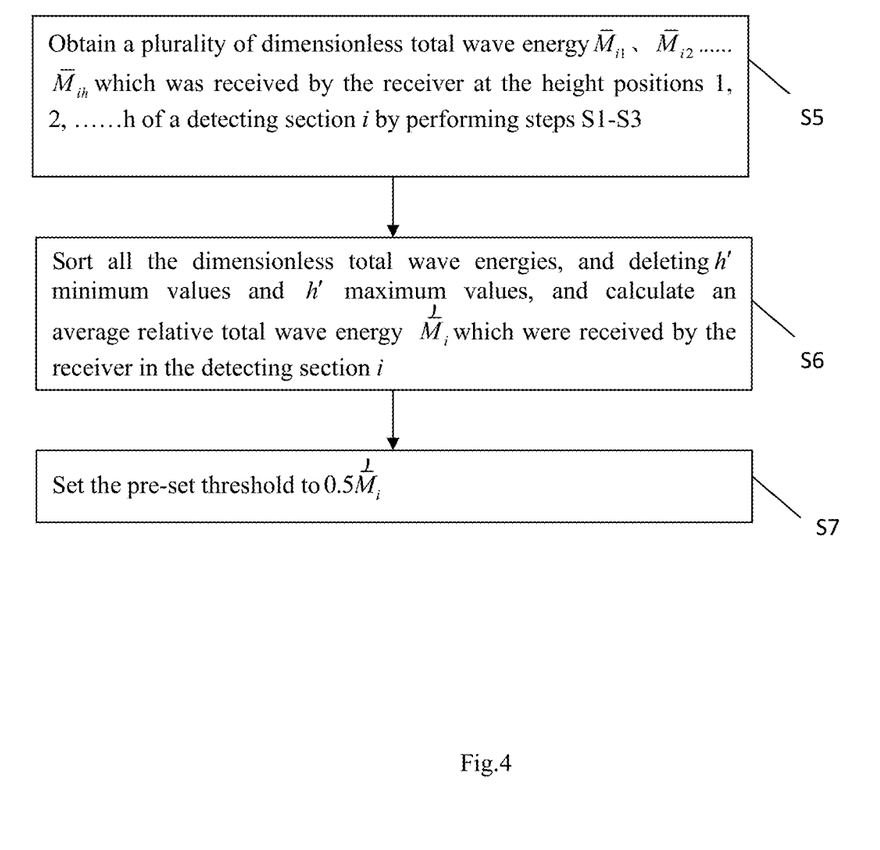
FIG. 4 depicts a schematic diagram of steps of setting the threshold preset in the cloud computing module in accordance with one embodiment of the invention.

Specifically, as shown in FIG. 4, the cloud computing module is further configured to perform the following steps to implement the setting of the preset threshold:

S5. Getting a plurality of dimensionless total wave energy $\overline{M}_{i1}, \overline{M}_{i2}, \ldots, \overline{M}_{ih}$ which were received by the receiver at height positions 1, 2 . . . h of the detecting section i by performing the above steps S1-S3;

S6. Sorting all the dimensionless total wave energies, and deleting h' minimum values and h' maximum values, and calculating an average relative total wave energy $\overset{\downarrow}{\overline{M}}_i$ which were received by the receiver in the detecting section i, by the following formula:

$$\overset{\downarrow}{\overline{M}}_i = \frac{1}{h - 2h'} \sum_{j=1}^{h-2h'} \overline{M}_{ij}$$

Wherein: h and h' are positive integers, and h'=2h/5;

S7. Setting the preset threshold to $0.5 \overset{\downarrow}{\overline{M}}_i$.

By performing the above steps, S5 to S7, the cloud computing module averages the total wave energy values in a plurality of height positions, to obtain a pre-set threshold which represents the average integrity information of the to-be-detected pile. Comparing this preset threshold with the total wave energy values at various height positions, the integrity information of the pile in various height positions can be obtained more accurately.

Specifically, the communication transmission module further comprises an encryption module which is configured to encrypt the to-be-transmitted data before transmitting the data; the cloud computing module further comprises a decryption module which is configured to decrypt the data after receiving the encrypted data.

Therefore, the communication transmission module can encrypt the data during data transmission, and the cloud computing module can decrypt the data during data receiving, whereby ensuring the security of the data during transmission.

Specifically, the ultrasonic detector further comprises a transmission mechanism which is connected to a controller and a cable respectively, and the controller sends a traction command to the transmission mechanism when receiving a transmission instruction from the user. The transmission mechanism is configured to receive a traction command from the controller, and tow the cable controlling the simultaneous movement of the transmitter and the receiver according to the traction command. The traction command indicates the traction speed of the transmission mechanism.

Specifically, the transmission mechanism comprises a driving motor and a transmission wheel;

The transmission wheel is fixed to the driving shaft of the driving motor, and is connected to the cable;

The driving motor is connected to the controller, when the driving motor receives the traction command, it can drive the driving shaft to rotate and subsequently drive the drive wheel to tow the cable, where by the transmitter and the receiver can be moved up/down simultaneously.

Specifically, the cloud computing module further comprises a report generating module which can generate a detection report for a to-be-detected pile by filling the integrity information of the to-be-detected pile into a report template.

By means of this report generating module, the cloud computing module can export the detection report directly upon the integrity information available, without any manual writing, saving manpower and material resources.

Specifically, the field detection module further comprises a storage which can store the wave energy data, the project data, the geographical location information, and the image data.

Although the present invention has been disclosed in the form of preferred embodiments and variations thereon, it will be apparent that any non-substantive, obvious alterations or improvement by the technician of this technical field according to the present invention may be incorporated into ambit of claims of the present invention.

What is claimed is:

1. A pile integrity detection system based on cross-hole sonic logging method, comprising a field detection module, a communication transmission module, and a cloud computing module; the field detection module is connected to the cloud computing module via the communication transmission module;

the field detection module comprises an ultrasonic detector which is connected to the communication transmission module; the ultrasonic detector comprises a controller, a transmitter and a receiver; the transmitter and the receiver are respectively connected to the controller via cables;

the controller is configured to, when receiving a sending instruction from the user, send an acoustic wave transmitting instruction to the transmitter, receive wave energy data of the receiver, and receive project data inputted by the user;

the transmitter is disposed and can be moved up/down in a first measuring tube of a to-be-detected pile, and can emit acoustic waves to the receiver according to the acoustic wave transmitting instruction which indicates the frequency and time period of emitting the acoustic wave;

the receiver is disposed and can be moved up/down in a second measuring tube of the to-be-detected pile, receiving acoustic waves emitted by the transmitter, then converting the received acoustic waves into wave energy data and transmitting it to the controller; the receiver and the transmitter are always disposed at same height, moved up/down simultaneously; the project data includes a centre-to-centre distance between the first measuring tube and the second measuring tube, and the compression wave velocity of the pouring concrete of the to-be-detected pile; the wave energy data includes an acoustic energy and a travel time of the acoustic waves, and the travel time is a period the acoustic wave reached the receiver from the transmitter;

the communication transmission module is configured to, when receiving a transmission instruction from the user, transmit the project data and the wave energy data in the field detection module to the cloud computing module;

the cloud computing module is configured to perform data analysis on the project data and the wave energy data by using a preset wave energy analysis method to determine the integrity of the to-be-detected pile;

the wave energy data includes a wave energy and an acoustic time of the acoustic wave which was emitted by the transmitter, and was received by the receiver at different heights of several detecting sections; the detecting section is composed of any two measuring tubes within the to-be-detected pile;

the cloud computing module is configured to perform the following steps to implement data analysis on the wave energy data and the project data, determine the integrity of the to-be-detected pile:

S1. calculating the total wave energy $M_{ij}$ of the acoustic wave which was emitted by the transmitter, and was received by the receiver at height j of a detecting section i in a preset time period $[t_{ij}^k, t_{ij}^n]$, the calculation formula is as follows:

$$M_{ij} = \int_{t_{ij}^k}^{t_{ij}^n} |A_p(\zeta)| d\zeta$$

wherein i,j,k, and n are positive integers;

$A_p(\zeta)$ is the wave energy which was received by the receiver at travel time $\zeta$;

$t_{ij}^k$ is the travel time of the acoustic wave which was received by the receiver at height j of a detecting section i at time k, $t_{ij}^k = l_i/V_p$, where $l_i$ is the centre-to-centre distance between two measuring tubes in the detection section i, $V_p$ is the compression wave velocity of the pouring concrete of the to-be-detected pile;

$M_{ij}$ is the total wave energy at height j of the detecting section i in time period $[t_{ij}^k, t_{ij}^n]$, and $[t_{ij}^k, t_{ij}^n]$ is 4 to 6 times the time period of emitting the acoustic wave;

S2. Calculating the total wave energy $M_{ij}$ by using a trapezoidal integration method, like the following formula:

$$M_{ij} = \sum_{m=k}^{n} \left[ \frac{1}{2} (|A_p(t_{ij}^m)| + |A_p(t_{ij}^{m+1})|) \Delta t \right]$$

wherein: m is a positive integer; $\Delta t$ is the time subinterval of receiving the acoustic wave by the receiver;

S3. performing dimensionless processing on the total wave energy $M_{ij}$ to obtain the dimensionless total wave energy $\overline{M}_{ij}$, which was received by the receiver at height j of the detecting section i in a preset time period $[t_{ij}^k, t_{ij}^n]$, by the following formula:

$$\overline{M}_{ij} = \sum_{m=k}^{n} \left[ \frac{1}{2} (|A_p(t_{ij}^m)| + |A_p(t_{ij}^{m+1})|) \Delta t \right] \Big/ (t_{ij}^n - t_{ij}^k)$$

S4. comparing the dimensionless total wave energy $\overline{M}_{ij}$ with a preset threshold; when the dimensionless total wave energy $\overline{M}_{ij}$ is less than the preset threshold, the cloud computing module determines that some flaws exist at the height j of the detecting section i in the to-be-detected pile; otherwise, the cloud computing module determines that the height j of the detecting section i in the to-be-detected pile is normal.

2. The pile integrity detection system of claim 1, wherein the cloud computing module is further configured to perform the following steps to implement the setting of the preset threshold:

S5. getting a plurality of dimensionless total wave energy $\overline{M}_{i1}, \overline{M}_{i2}, \ldots, \overline{M}_{ih}$ which were received by the receiver at height positions 1, 2, ..., ... h of the detecting section i by performing the above steps S1-S3;

S6. sorting all the dimensionless total wave energies, and deleting h' minimum values and h' maximum values, and calculate an average relative total wave energy $\overline{\overline{M}}$, which were received by the receiver in the detecting section i, by the following formula:

$$\overline{\overline{M}}_i = \frac{1}{h-2h'} \sum_{j=1}^{h-2h'} \overline{M}_{ij}$$

wherein: h and h' are positive integers, and h'=2h/5;

S7. setting the preset threshold to $0.5\overline{\overline{M}}$.

3. The pile integrity detection system of claim 1, wherein the field detection module further comprises a photographing module which is connected to the communication transmission module, and is configured to record an audio and video data of the testing site when the operator detects the to-be-detected pile, and subsequently the audio and video data are transmitted to the cloud computing module via the communication transmission module.

4. The pile integrity detection system of claim 1, wherein the communication transmission module further comprises an encryption module which is configured to encrypt a to-be-transmitted data before transmitting the data; the cloud computing module further comprises a decryption module which is configured to decrypt the data after receiving the encrypted data.

5. The pile integrity detection system of claim 1, wherein the ultrasonic detector further comprises a transmission mechanism which is connected to a controller and a cable respectively, and the controller sends a traction command to the transmission mechanism when receiving a transmission instruction from the user; the transmission mechanism is configured to receive the traction command from the controller, and tow the cable controlling the simultaneous movement of the transmitter and the receiver according to the traction command; the traction command indicates a traction speed of the transmission mechanism.

6. The pile integrity detection system of claim 5, wherein the transmission mechanism comprises a driving motor and a transmission wheel;

the transmission wheel is fixed to a driving shaft of the driving motor, and is connected to the cable; and the drive motor is connected to the controller, when the driving motor receives the traction command, and can drive the driving shaft to rotate subsequently drive the drive wheel to tow the cable, whereby the transmitter and the receiver can be moved up/down simultaneously.

7. The pile integrity detection system of claim 1, wherein the cloud computing module further comprises a report generating module which can generate a detection report for a to-be-detected pile by filling the integrity information of the to-be-detected pile into a report template.

8. The pile integrity detection system of claim 1, wherein the field detection module further comprises a storage which can store the wave energy data, the project data, a geographical location information, and the image data.

9. The pile integrity detection system of claim 1, wherein the field detection module further comprises a GPS locator which is connected to the communication transmission module, and is configured to acquire a geographic location information of the to-be-detected pile, and the geographic location information is transmitted to the cloud computing module via the communication transmission module, then the cloud computing module compares the geographic location information with a preset geographic location information of the to-be-detected pile to verify the authenticity of the wave energy data.

* * * * *